(12) United States Patent
Atkins et al.

(10) Patent No.: US 11,536,190 B2
(45) Date of Patent: Dec. 27, 2022

(54) SPLIT CYCLE INTERNAL COMBUSTION ENGINE

(71) Applicant: Dolphin N2 Limited, Shoreham-by-Sea (GB)

(72) Inventors: Andrew Atkins, Shoreham-by-Sea (GB); Robert Morgan, Shoreham-by-Sea (GB)

(73) Assignee: Dolphin N2 Limited

( * ) Notice: Subject to any disclaimer, the term of this patent is extended or adjusted under 35 U.S.C. 154(b) by 0 days.

(21) Appl. No.: 17/388,460

(22) Filed: Jul. 29, 2021

(65) Prior Publication Data
US 2021/0355861 A1 Nov. 18, 2021

Related U.S. Application Data

(63) Continuation of application No. 16/498,271, filed as application No. PCT/GB2018/050642 on Mar. 13, 2018, now Pat. No. 11,092,066.

(51) Int. Cl.
*F02B 29/04* (2006.01)
*F02B 33/30* (2006.01)
(Continued)

(52) U.S. Cl.
CPC .......... *F02B 33/22* (2013.01); *F02B 29/0406* (2013.01); *F02B 29/0481* (2013.01);
(Continued)

(58) Field of Classification Search
CPC ...... F02B 33/22; F02B 33/30; F02B 29/0406; F02B 29/0481; F02B 29/0493; F02B 47/02; F02M 25/0227
(Continued)

(56) References Cited

U.S. PATENT DOCUMENTS 3,715,416 A * 2/1973 Campbell .............. D01D 1/106
264/169
4,020,798 A 5/1977 Skala
(Continued)

FOREIGN PATENT DOCUMENTS

CA 3014822 C 6/2020
CN 101418716 A 4/2009
(Continued)

OTHER PUBLICATIONS

International Search Report including the Written Opinion from Application No. PCT/GB2018/050642 dated Jul. 24, 2018, pp. 1-14.
(Continued)

*Primary Examiner* — Mahmoud Gimie
(74) *Attorney, Agent, or Firm* — Lerner, David, Littenberg, Krumholz & Mentlik, LLP

(57) ABSTRACT

A split cycle internal combustion engine apparatus includes a combustion cylinder accommodating a combustion piston and a compression cylinder accommodating a compression piston. The apparatus is arranged to provide compressed fluid to the combustion cylinder. The compression cylinder is coupled to a first liquid coolant reservoir and a second liquid coolant reservoir. A controller is arranged to receive an indication of at least one parameter associated with the engine, and control delivery of at least one of the first liquid coolant from the first liquid coolant reservoir and the second liquid coolant from the second liquid coolant reservoir to the compression cylinder based on the indication of the at least one parameter such that the at least one liquid coolant vaporises into a gaseous phase during a compression stroke.

18 Claims, 9 Drawing Sheets

(51) Int. Cl.
  *F02B 47/02* (2006.01)
  *F02M 25/022* (2006.01)
  *F02B 33/22* (2006.01)
(52) U.S. Cl.
  CPC ........... *F02B 29/0493* (2013.01); *F02B 33/30* (2013.01); *F02B 47/02* (2013.01); *F02M 25/0227* (2013.01)
(58) Field of Classification Search
  USPC ...................................................... 123/25 C
  See application file for complete search history.

(56) References Cited

U.S. PATENT DOCUMENTS

| | | | |
|---|---|---|---|
| 4,167,159 A * | 9/1979 | Warman | F01P 3/2207 165/104.32 |
| 4,224,798 A | 9/1980 | Brinkerhoff | |
| 4,367,698 A | 1/1983 | Skala | |
| 5,296,137 A * | 3/1994 | Gershon | C02F 1/003 210/287 |
| 5,771,693 A | 6/1998 | Coney | |
| 6,126,818 A | 10/2000 | Duerrstein et al. | |
| 7,571,699 B2 | 8/2009 | Forner, Sr. et al. | |
| 8,925,526 B2 | 1/2015 | Anders et al. | |
| 2004/0079695 A1 | 4/2004 | Frerichs et al. | |
| 2004/0216699 A1 | 11/2004 | Sundholm | |
| 2007/0277775 A1* | 12/2007 | Orlosky | F02M 25/14 123/25 J |
| 2008/0097679 A1 | 4/2008 | Keays | |
| 2008/0202454 A1 | 8/2008 | Pirault | |
| 2009/0205606 A1 | 8/2009 | Kawamata | |
| 2009/0318039 A1* | 12/2009 | Hays | F01P 11/029 440/88 C |
| 2010/0193415 A1 | 8/2010 | Nagai | |
| 2010/0229806 A1 | 9/2010 | Kemeny | |
| 2012/0031371 A1 | 2/2012 | Sabathil | |
| 2012/0080384 A1* | 4/2012 | Reinosa | B01D 35/306 210/695 |
| 2012/0103314 A1* | 5/2012 | Jackson | F25J 1/0228 123/70 R |
| 2012/0118249 A1 | 5/2012 | Rohs et al. | |
| 2013/0233288 A1 | 9/2013 | Schnepel | |
| 2015/0151225 A1* | 6/2015 | Reinosa | B01D 35/005 137/544 |
| 2016/0160740 A1* | 6/2016 | Camera | F01P 11/029 220/501 |
| 2016/0273455 A1* | 9/2016 | Fausett | F02C 7/224 |
| 2018/0119649 A1 | 5/2018 | Obergfaell et al. | |

FOREIGN PATENT DOCUMENTS

| | | | |
|---|---|---|---|
| CN | 201961310 U | * | 9/2011 |
| CN | 102536427 A | | 7/2012 |
| DE | 19637299 A1 | | 3/1998 |
| DE | 102015208502 A1 | | 11/2016 |
| EP | 2650521 A1 | | 10/2013 |
| GB | 2535693 A | | 8/2016 |
| IT | MI20 102449 A1 | | 6/2012 |
| JP | H07507370 A | | 8/1995 |
| JP | H8261004 A | | 10/1996 |
| JP | 2003247437 A | | 9/2003 |
| JP | 2007247438 A | | 9/2007 |
| JP | 2007270622 A | | 10/2007 |
| JP | 2009115024 A | | 5/2009 |
| JP | 2010519462 A | | 6/2010 |
| JP | 2012511664 A | | 5/2012 |
| JP | 2013536916 A | | 9/2013 |
| JP | 2016000997 A | | 1/2016 |
| WO | 0061923 A1 | | 10/2000 |
| WO | 2010067080 A1 | | 6/2010 |

OTHER PUBLICATIONS

Combined Search and Examination Report for Application No. GB 1705046.9 dated Apr. 19, 2017, pp. 1-3.
Combind Search and Examination Report for Application No. GB2001557.4 dated Feb. 24, 2020; 5 pages.
Extended European Search Report including Written Opinion for EP18714348.2 dated Jan. 22, 2021; 8 pages.
Combined Search and Examination Report for Application No. GB2103869.0 dated May 10, 2021; 2 pages.
First Office Action in Chinese Application No. 201880034898.0 dated Mar. 3, 2021; 13 pages.

* cited by examiner

This is a simple proportional approach which with rate of change of demand could be more adaptive. This would be required for more transient machines.

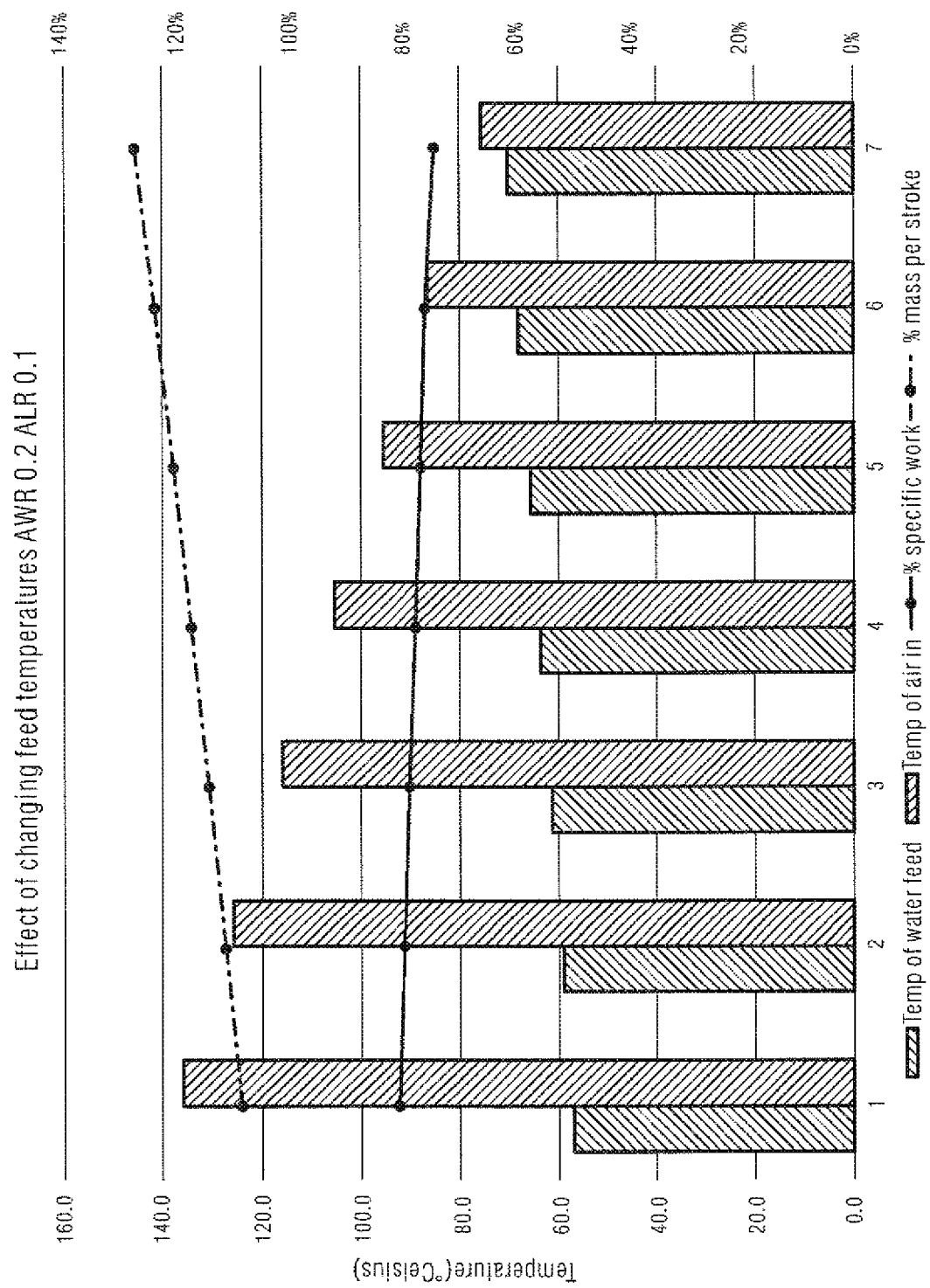

SPLIT CYCLE INTERNAL COMBUSTION ENGINE

CROSS-REFERENCE TO RELATED APPLICATIONS

The present application is a continuation of U.S. patent application Ser. No. 16/498,271, filed on Sep. 26, 2019, which is a national phase entry under 35 U.S.C. § 371 of International Application No. PCT/GB2018/050642, filed Mar. 13, 2018, published in English, which claims priority from Great Britain Patent Application No. 1705046.9, filed Mar. 29, 2017, the disclosures of which are incorporated by reference herein.

FIELD OF THE INVENTION

The invention relates to the field of split cycle internal combustion engines.

INTRODUCTION

Conventional internal combustion engines using the Diesel or Otto cycle typically perform both the compression and the combustion/expansion in the same cylinder. However, split cycle internal combustion engines perform the compression and combustion/expansion stages in different cylinders. In such engines a fluid may be injected into the compression cylinder whilst air is being compressed. This has the effect of absorbing some of the heat produced during the compression stroke so that the compression may be considered at least quasi-isothermal.

WO 2010/067080 A1 discloses a split cycle reciprocating piston engine configured to inject liquid nitrogen into a compression cylinder to act as a coolant.

SUMMARY OF THE INVENTION

Aspects of the invention are as set out in the independent claims and optional features are set out in the dependent claims. Aspects of the invention may be provided in conjunction with each other and features of one aspect may be applied to other aspects.

FIGURES

Embodiments of the invention will now be described, by way of example only, with reference to the drawings, in which.

Figure 1:
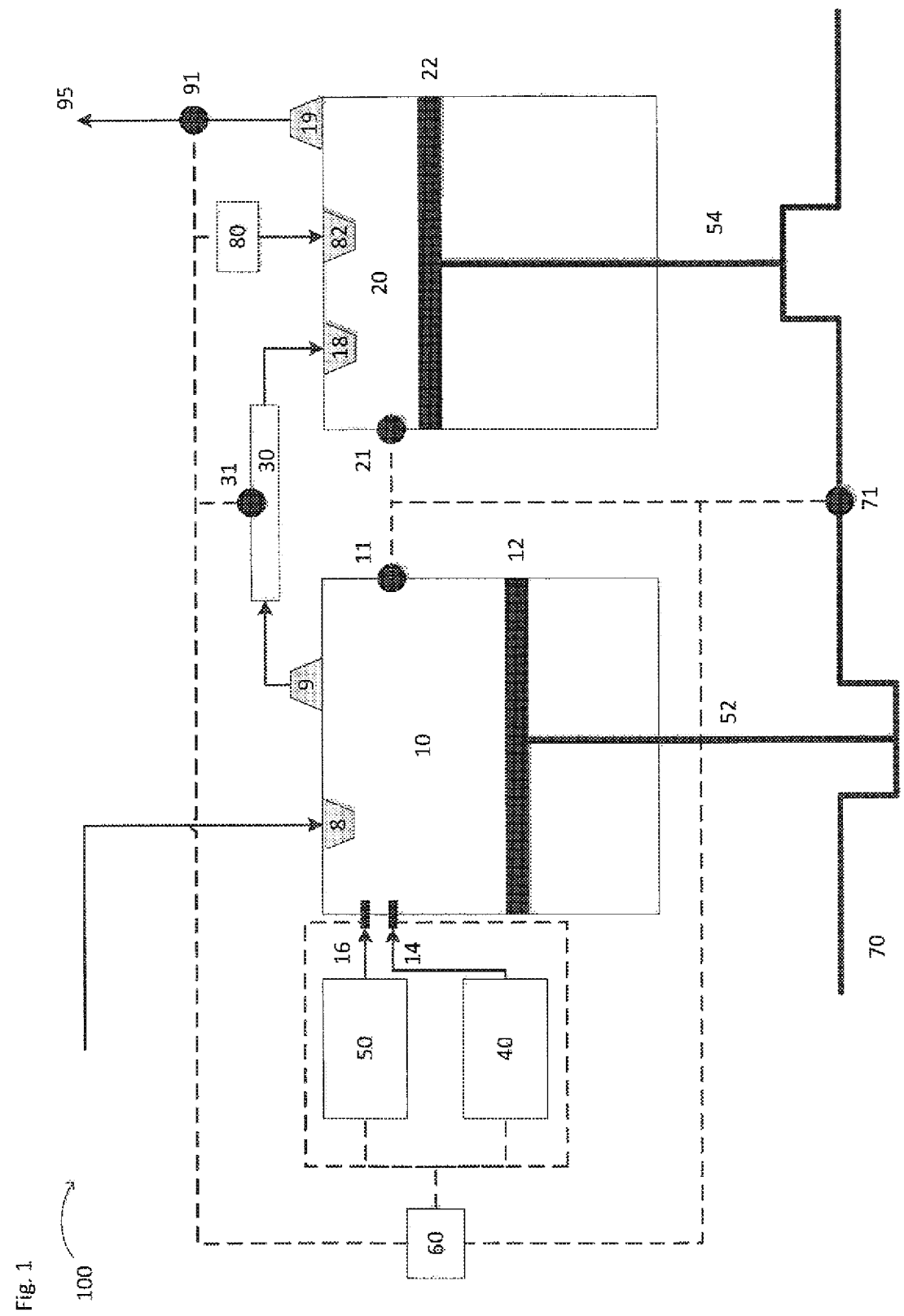
FIG. 1 shows a schematic diagram of an exemplary split cycle internal combustion engine apparatus.
Figure 2:
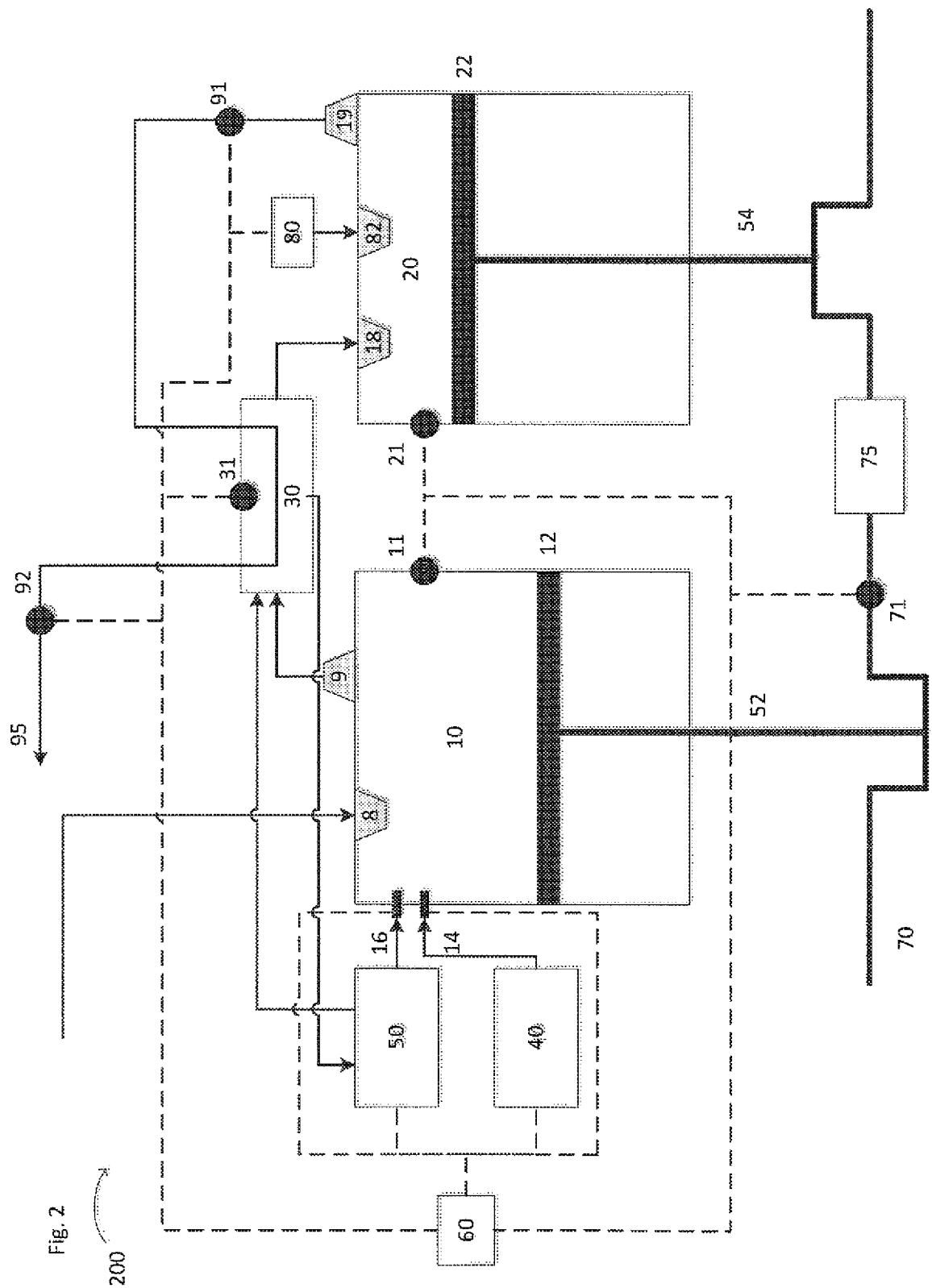
FIG. 2 shows a schematic diagram of an exemplary split cycle internal combustion engine apparatus.
Figure 8:
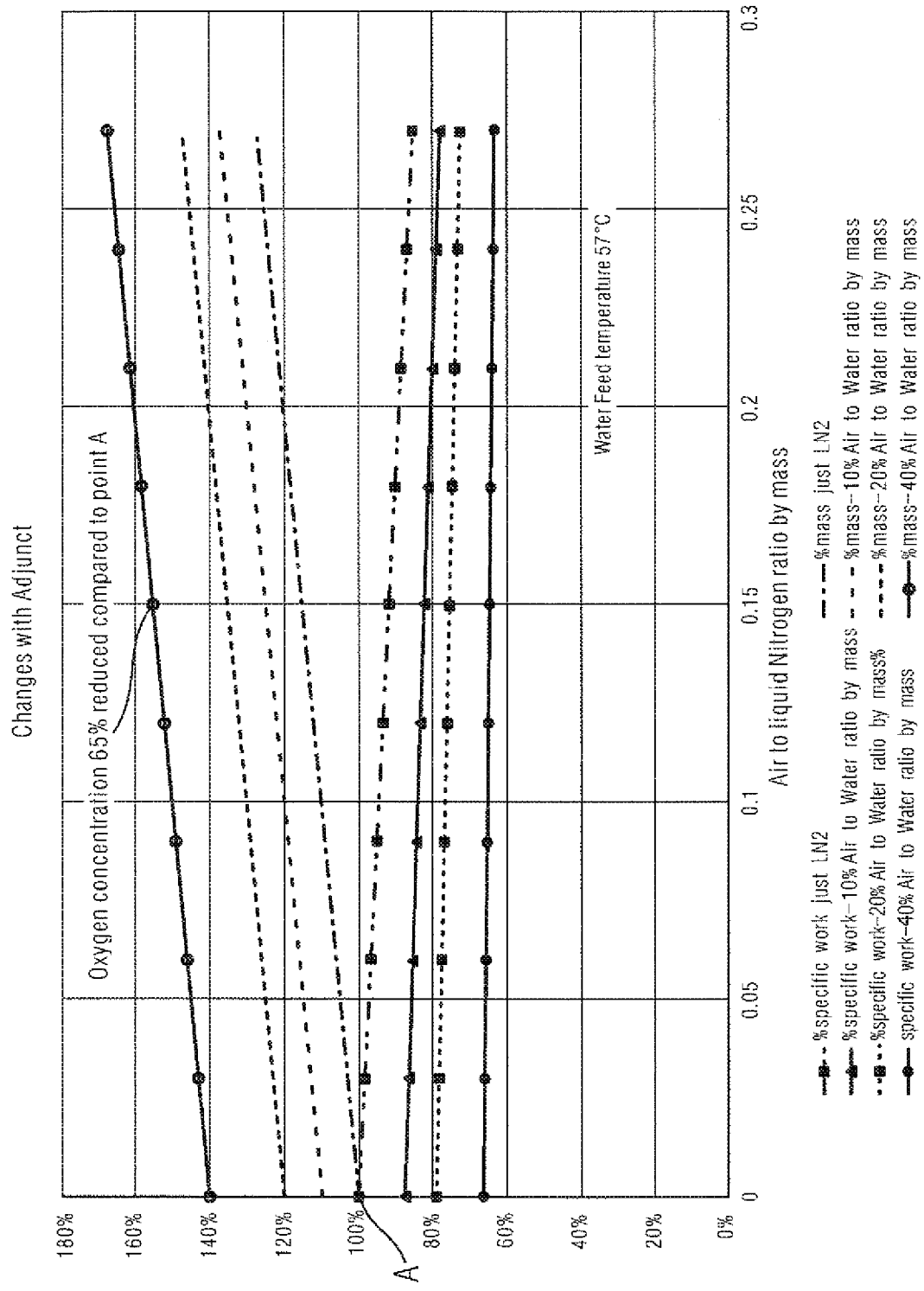

FIG. 8 is a graph showing how work and mass change with the introduction of water and liquid nitrogen as example liquid coolants in the compression cylinder of a split-cycle engine apparatus, for example the split-cycle engine apparatus of FIGS. 1 and 2; and FIG. 9 is a graph illustrating the effect of changing the feed temperature of air entering the compression cylinder 10 based on an air-to-liquid nitrogen ratio of 0.1 and an air-to-water ratio of 0.2.

SPECIFIC DESCRIPTION

FIG. 1 shows a split cycle internal combustion engine apparatus 100 configured to use two different types of liquid coolant. The two liquid coolants may be selected so that they have different thermal properties, and so that combinations of the two liquid coolants may be used which provide improved engine performance. At least one of the liquid coolants may have been condensed into its liquid phase via a refrigeration process. The engine includes a controller which in operation receives an indication of at least one parameter of the engine, and uses this indication to control the delivery of at least one of the liquid coolants to a compression cylinder of a split-cycle engine in liquid form (for example, via direct injection) such that the liquid coolant vaporises into its gaseous phase during a compression stroke and a rise in temperature caused by the compression stroke is limited by the absorption of heat by the coolant. The controller may therefore be configured to deliver a combination of coolants that can be selected, for example, based on the demands of the engine. For example, the at least one liquid coolant is selected so that a phase change of the liquid coolant limits a rise in temperature caused by the compression stroke, for example the latent heat of vaporisation of the liquid coolant as it vaporises. Advantageously this may allow for a greater mass of air per compression stroke and therefore a more efficient engine. A more efficient engine has a clear environmental benefit.

FIG. 1 shows a split cycle internal combustion engine apparatus 100 comprising a compression cylinder 10 and a combustion cylinder 20. The compression cylinder 10 accommodates a compression piston 12, which is connected via a connecting rod 52 to a respective crank on a portion of a crank shaft 70. The combustion cylinder 20 accommodates a combustion piston 22, which is coupled via a connecting rod 54 to a respective crank on a portion of the crank shaft 70. The compression cylinder 10 is coupled to the combustion cylinder 20 via a recuperator 30. The compression cylinder 10 comprises an inlet port 8 for receiving air from outside the engine, and an outlet port 9 coupled to the recuperator 30. The outlet port 9 comprises a non-return valve so that compressed air cannot flow back into the compression cylinder 10. The combustion cylinder 20 comprises an inlet port 18, which is also coupled to the recuperator 30, and an outlet port 19 for passing exhaust from the combustion cylinder 20 to an exhaust 95. These couplings provide an air flow path for air between the compression cylinder 10 and the combustion cylinder 20 via the recuperator 30.

The engine 100 also comprises a first liquid coolant reservoir 40, a second liquid coolant reservoir 50, a controller 60 and a fuel reservoir 80. The first liquid coolant reservoir 40 is coupled to the compression cylinder 10 via a first injector 14 thereby defining a first liquid flow path, and the second liquid coolant reservoir 50 is coupled to the compression cylinder 10 via a second injector 16 thereby defining a second liquid flow path. The fuel reservoir 80 is coupled to the combustion cylinder 20 via a third injector 82 so that a fluid flow path is defined between the fuel reservoir 80 and the combustion cylinder 20.

The engine 100 comprises a plurality of sensors illustrated as black dots coupled to a controller 60. However, it is to be appreciated that the sensors illustrated are only exemplary and there could be a different number of sensors or they could be placed in different locations. For example, the inlet port 8 may also comprise a temperature sensor. The sensors could be coupled to the controller 60 through physical wires or could be connected wirelessly. In the example shown in FIG. 1 there is a compression sensor 11 within the compression cylinder 10. The sensor may for example be mounted proximate to the air inlet port 8 or proximate to one or both of the injectors 12, 14. The example engine 100 shown in FIG. 1 also comprises a combustion sensor 21 within the combustion cylinder 20, and a recuperator sensor 31 within the recuperator 30. Additionally, the engine 100 comprises a crank sensor 71 mounted to the crankshaft 70, and an exhaust sensor 91 downstream of the outlet port 19 of the combustion cylinder 20. In some examples, the first and second liquid coolant reservoirs 40, 50 also comprise respective sensors, for example, for measuring a quantity, such as mass, of liquid contained in the reservoirs 40, 50.

The controller 60 is coupled to the sensors and at least one of the first and second injectors 14, 16. In the example shown in FIG. 1, the controller 60 is coupled to both the first and second injectors 14, 16, as well as the third injector 82.

The sensors are configured to send at least one signal to the controller 60 providing an indication of at least one parameter associated with the engine 100. For example, in the example shown in FIG. 1, the compression sensor 11 is configured to measure at least one parameter associated with the compression cylinder 10. The combustion sensor 21 is configured to measure at least one parameter associated with the combustion cylinder 20. The recuperator sensor 31 is configured to measure at least one parameter associated with the recuperator 30. Additionally, the crank sensor 71 is configured to measure RPM for the engine, and the exhaust sensor 91 is configured to measure at least one parameter of exhaust gas expelled through the outlet port 19 of combustion cylinder 20.

The engine 100 is arranged such that air is drawn into the compression cylinder 10 through the inlet port 8 of the compression cylinder 10. The compression piston 12 is arranged to compress this air, and during the compression phase, liquid coolant is added into the compression cylinder 10. The recuperator 30 is arranged to receive the compressed air via the outlet port 9 and pass it into the combustion cylinder 20 via inlet port 18. The engine 100 is further arranged to add fuel from the fuel reservoir 80 to the compressed air in the combustion cylinder 20 via the third injector 82, and combust the mixture of fuel and compressed air (for example via operation of an ignition source, not shown) to extract useful work via turning of the crankshaft 70.

The fuel reservoir 80 is connected to the controller 60 so that the controller 60 controls the delivery of fuel into the combustion cylinder 20. In some examples, the controller 60 is configured to determine the amount of fuel to be injected based on the indication of the at least one parameter of the engine 200. For example the controller 60 may be configured to obtain the indication of the at least one parameter via a signal received from the exhaust sensor 91. Each of the sensors are configured to send a respective signal to the controller 60, and the controller 60 is configured to make a determination for controlling delivery of at least one of the first liquid coolant and the second liquid coolant based on these received signals. The controller 60 is configured to control delivery of at least one of the first and second coolants respectively such that the liquid coolant vaporises into its gaseous phase during a compression stroke of the compression piston 12 and a rise in temperature caused by the compression stroke is limited by the absorption of heat by the liquid coolant. For example, the controller 60 is operable to control the timing of the first and second injectors 14, 16 to dispense liquid into the compression cylinder 10 based on the position of the compression piston 12 in the compression cylinder 10, for example as determined by a crank angle measured by the crank sensor 71. In some examples the controller 60 may additionally or alternatively be configured to operate one or more pumps in each of the respective liquid reservoirs 40, 50, to control delivery of at least one of the liquid coolants to the compression cylinder 10.

The controller 60 and the injectors 14, 16 are configured to inject the liquid coolant directly into the compression cylinder 10 at a low pressure, for example less than 10 MPa, for example less than 5 MPa, for example less than 4.6 MPa, for example less than 1.3 MPa, for example less than 0.3 MPa. This may have the advantage of not requiring a specialist cryogenic pump for pumping the liquid coolant into the compression cylinder 10. The liquid coolant can be injected directly into the compression cylinder 10 in the liquid phase and in the form of a spray of droplets but with a large distribution in droplet sizes. Having a large distribution in droplet sizes is thermodynamically favourable because it spreads out the temperature and/or time range over which the liquid coolant vaporises into the gaseous phase during the compression stroke of the compression piston 12.

The first liquid coolant may be a liquid coolant which has been condensed into a liquid phase via refrigeration. For example, the first liquid coolant may be a cryogenic liquid such as liquid nitrogen ($LN_2$). The second liquid coolant may be water. It will be understood, however, that any other non-oxidising, non-combustible liquefied gas may be used as the first and/or second liquid coolants, for example a gas that has been liquefied via a refrigeration process, such as air, oxygen or argon. The fuel may be a fuel that requires a source of ignition (for example the ignition source may comprise spark plugs in the combustion cylinder) such as gasoline, hydrogen, liquefied natural gas, and compressed natural gas. Alternatively the fuel may be a fuel which does not require a source of ignition, for example, it may be a compression-ignited fuel such as diesel.

The controller 60 is configured to determine the delivery requirements for at least one of the liquid coolants and to control the injectors to meet said delivery requirements. The delivery requirements may, for example, be based on current operating conditions of the engine 100 (such as load or operating temperature) or may be based on the amount of liquid coolant in each of the respective reservoirs 14, 16, so that resources may be conserved. The controller 60 is configured to determine the delivery requirements in response to receiving an indication of at least one parameter associated with the engine 100. For example, the controller 60 may comprise at least one lookup table (LUT), and may be configured to determine a delivery requirement based on a received signal comprising at least one data value from a sensor and based on a comparison of that received data value in the lookup table. Receiving the indication may be in the form of receiving feedback such as a signal from one or more of the plurality of sensors. It is to be appreciated in the context of this disclosure a variety of parameters of the engine may be monitored by the controller 60. Such parameters may include parameters relating to the compression cylinder 10, such as temperature, pressure or saturation of liquid coolant, and may be measured in a number of places throughout the engine 100.

In some examples, the compression sensor 11 is configured to measure pressure and/or temperature in the compression cylinder 10, the combustion sensor 21 is configured to measure pressure and/or temperature in the combustion cylinder 10 and the recuperator sensor 31 is configured to measure the oxygen concentration level, the water saturation level, pressure and temperature in the recuperator. Additionally, the crank sensor 71 is configured to measure an RPM for the crankshaft 70 and the exhaust sensor 91 is configured to measure pressure and/or temperature of the exhaust, and/or the composition of the exhaust, for example the concentration of carbon dioxide, nitrogen dioxide, or other gases or particulates in the exhaust. There may be a number of other inputs for the controller 60, such as a current operating RPM of the compression cylinder 10 and/or the combustion cylinder 20. Likewise, the controller 60 may be configured to receive a demand signal representative of the current levels of demand for the engine, or any other indication which may have an effect on the way in which the liquid coolant and/or fuel could be used.

In operation, air is drawn into the compression cylinder 10 through the inlet port 8 of the compression cylinder 10 via movement of the compression piston 12 downward through the compression cylinder 10 by rotation of the crankshaft 70 until the compression piston 12 reaches bottom dead centre (BDC). The crankshaft 70 continues to rotate and pushes the compression piston back up from BDC towards top dead centre (TDC). As the compression piston 12 travels upwards toward TDC, the compression piston 12 compresses this air. The controller 60 receives indications of at least one parameter of the engine 100 from sensors in the engine 100, and in response, controls delivery of at least one of the liquid coolants during the compression phase by injecting the at least one liquid coolant into the compression cylinder 10 in a liquid phase, for example in the form of a liquid spray via injectors 14, 16. As the compression piston 12 continues to move towards TDC, the injected liquid coolant vaporises into a gaseous phase and the latent heat of vaporisation at least partially limits a rise in temperature of the air in the compression cylinder 10 due to its compression.

The recuperator 30 then receives the compressed fluid (comprising the vaporised liquid coolant) from the compression cylinder 10 via the outlet port 9 and passes it into the combustion cylinder 20 via inlet port 18. In the process, the recuperator 30 heats the compressed air to a desired temperature, for example to aid the combustion process in the combustion cylinder 10. The controller then operates the third injector 82 to deliver fuel to the compressed air in the combustion cylinder 20, and combusts the mixture of fuel and compressed air and vaporised liquid coolant (for example by operating an ignition source such as a spark plug, not shown) to extract useful work via turning of the crankshaft 70.

Several examples will now be discussed below where the controller 60 receives an indication at least one parameter of the engine 100 and, in response to receiving said at least one indication, the controller 60 controls the delivery of at least one liquid coolant to the compression cylinder 10.

In a first example, the first coolant is a liquid that has been liquefied via a refrigeration process, such as liquid nitrogen, and the second coolant is water, and the at least one parameter is a water saturation level. The water saturation level is detected based on measuring the temperature and pressure of the air entering into the compression cylinder 10 via the inlet port 8. Using the pressure and temperature of the air in the compression cylinder 10 (which of course has a known volume depending on the location of the compression piston 12, which can be determined by a crank angle as measured by sensor 71), a number of moles of air contained within the compression cylinder 10 may be determined. Using Dalton's law of partial pressures, the pressure of the added medium is proportional to the molar concentration. Accordingly, the controller 60 can determine whether or not the water will boil (based on known values of pressure-dependent boiling temperatures of water, for example stored in a look up table in the controller 60), and by measuring the amount of water injected into the compression cylinder 10 via injector 16, (for example using a flow meter) it is possible for the controller 60 to determine the water saturation level.

In response to determining the water saturation level of the compression cylinder 10, the controller 60 may be configured determine a quantity of liquid coolant to inject and operate the injectors 14, 16 to inject either liquid nitrogen and/or water based on the water saturation level. For example, the controller 60 may use water as the only coolant until the water saturation reaches a threshold level. Above this threshold level, only the second liquid coolant (liquid nitrogen) may be injected into the compression cylinder 10 and no water may be injected. Additionally or alternatively, the controller 60 may be configured to use a combination of water and liquid nitrogen to achieve a desired level of water saturation. For example, the controller 60 may be configured to adjust the ratio of the two liquid coolants injected into the compression cylinder 10 based on the water saturation level.

The controller 60 may comprise stored data, for example in the form of a lookup table, which defines the water saturation threshold. This threshold may be defined in a number of ways. However, it is preferable to reduce the amount of liquid water in the combustion cylinder 20, such as having no liquid water in the combustion cylinder and only water in the form of water vapour in the combustion cylinder 20. Accordingly, the water saturation threshold may be determined to be less than 100% absolute humidity.

The controller 60 may be configured to determine the threshold based on other engine parameters, such as the volume of oxygen, the temperature or the pressure, as these parameters may affect the functioning of the engine and the boiling point of the water.

In a second example, the controller 60 may be configured to determine the temperature in the compression cylinder 10 based on an indication received via a signal from the compression sensor 11. In response to the controller 60 determining a temperature in the compression cylinder 10 being below a threshold value based on an indication received from the compression sensor 11, the controller 60 is configured to reduce the delivery of both a first liquid coolant and a second liquid coolant to the compression cylinder 10. Such a situation may happen when the engine 100 is first started and is relatively cold. Conversely, the controller 60 may be configured to increase the delivery of the first and/or second liquid coolants to the compression cylinder 10 in response to determining that the temperature is above the threshold value, for example once the engine has warmed up and/or is placed under a high load demand or is running at a high RPM.

In some examples, the controller 60 is configured to compare a current temperature value and a threshold value, and make a determination based on that comparison. For example, the controller 60 is configured to make a determination to control the delivery (for example in terms of mass) of at least one of the first liquid coolant and the second liquid coolant based on a comparison of the current temperature value with a threshold value. For example, the controller 60 is configured to control delivery of at least one of the first liquid coolant and the second liquid coolant in proportion to the difference from the threshold value, so that a greater or lesser quantity (for example mass) of liquid coolant is delivered based on the greater the difference from the threshold value.

The extent to which the delivery of the first and/or second liquid coolants changes may be proportional to a temperature difference between a temperature inside the compression cylinder 10 (for example as measured by the compression sensor 11) and a threshold temperature (for example as stored in the controller 60). In response to determining that the delivery of a liquid coolant to the compression cylinder should be increased, the controller 60 may only use one of the liquid coolants (such as water) as the liquid coolant until a (water) saturation threshold is reached. A similar approach may be adopted for other parameters of the engine, such as a pressure in the compression cylinder 10.

In a third example, the controller 60 is configured to determine an oxygen saturation level in the recuperator 30 based on an indication of a parameter received via a signal from the recuperator sensor 31. The controller 60 is configured so that if the oxygen saturation is above a threshold level, more liquid coolant is injected into the compression cylinder 10. The injection of liquid coolant may be in accordance with the approach described above.

In a fourth example, the controller 60 is configured to control the delivery of at least one of the liquid coolants based on a demand placed on the engine 100. For example, the controller 60 is configured to receive a signal indicating a desired output from the engine (for example, a desired torque, RPM or power output). In this example the first liquid coolant is a liquid that has been liquefied via a refrigeration process, such as liquid nitrogen, and the second liquid coolant is water. The controller 60 is configured to controller the delivery of the first liquid coolant and the second liquid coolant so that at a high demand (when the engine will be running hotter) more of the first liquid coolant is injected into the compression cylinder 10 relative to the second liquid coolant, but at a low demand (when the engine will be running cooler) the controller 60 is configured to inject more of the second liquid coolant relative to the first liquid coolant. In this way, the temperature of the compressed air in the compression cylinder 10 can be more accurately controlled to enable more efficient combustion and thereby a more efficient engine 100.

In some examples, the injectors 14, 16, 82 may also be configured to act as sensors and send a signal providing an indication of at least one parameter associated with the engine 100 to the controller 60. The injectors 14, 16, 82 may be configured to send a signal indicating, for example, at least one of the temperature of the injector, a resistance of a component of the injector (such as induction coils operable to cause the injector to inject a liquid) and/or a measurement indicating the amount (such as mass) of liquid injected via that injector 14, 16, 82. The injectors may be configured to inject the liquid coolant by direct injection and/or common rail injection, however, due to the low temperatures that may be involved, at least one injector 14, 16, 82 may not comprise a piezoelectric driving element but may be configured to operate at low temperatures, such as less than 100 Kelvin.

In some examples, the controller 60 is configured to determine and control the rate of delivery of one liquid coolant with respect to another liquid coolant. For example, the controller 60 may comprise a number of open or closed control loops to control the ratio of coolants injected into the compression cylinder 10. These feedback loops may include measurements of the temperature of the exhaust gases, the load of the engine, a desired level of differential temperatures and the density of the fluid. For example, the controller 60 may be a proportional-integral-derivative (PID) controller. In the example shown in FIG. 1, the controller 60 controls the ratio of the first liquid coolant to the second liquid coolant. Alternatively, the controller 60 may be configured to focus primarily on one coolant, and only use the other coolant in certain situations, such as when a threshold value is reached. This may help to conserve resources, for example when one of the liquid coolants is running low. In such an example, the controller 60 may retain the injection quantity of one coolant at a selected value, and in response to the controller 60 determining that more liquid coolant should be added to the compression cylinder 10, it is configured to add liquid coolant only from the same liquid coolant reservoir, until the threshold condition is reached. Once the threshold is reached, the controller 60 may be configured to switch so that only liquid coolant from the other reservoir is added.

In some examples, the injection of the spray of droplets by injectors 14, 16 is controlled (for example by the controller 60) to deliver a distribution of droplet sizes to provide steady heat absorption during the compression stroke, and a smooth heat transfer between the air in the cylinder 10 and the liquid coolant. In some examples, this will comprise determining (for example, by the controller 60) the distribution of droplet sizes that will provide heat absorption throughout the compression stroke, for example throughout a portion of the compression stroke or throughout the entire compression stroke (from BDC to TDC, for example). In the case of the liquid coolant being one that has been liquefied via a refrigeration process, the combination of the low temperature of the liquid coolant and the low pressure at which it is injected means that the liquid coolant is injected into the compression cylinder 10 in the liquid phase even when the temperature of the engine is high.

In some examples the liquid coolant is injected into the compression cylinder 10 in the form of a liquid flow. In some examples, the controller 60 is configured to control the rate of delivery of at least one of the liquid coolants such that the absorption of heat by the liquid coolant is commensurate with the instantaneous temperature difference between the liquid coolant and surrounding air in the cylinder 10.

In some examples, the inlet port 8 may be coupled to a turbocharger or any other forced induction device, such that the air entering the compression cylinder 10 has been charged. In some examples, the inlet port 8 may additionally or alternatively be coupled to an intercooler to cool the charged air. Charging and cooling the air in this way may also mean that a measurement of the pressure and temperature of air entering the compression cylinder 10 via inlet port 8 can be more accurately determined.

In some examples, the engine 100 may comprise a third liquid coolant reservoir and another liquid coolant injector coupled to third liquid coolant reservoir, and arranged to inject the third liquid coolant into a part of the engine 100, such as the compression cylinder 10 or recuperator 30. The third liquid coolant may be different to the first and second liquid coolants, and may be a non-oxidising, non-combustible gas, for example that has been liquefied into a liquid phase via a refrigeration process.

In some examples, the recuperator 30 may comprise an injector coupled to a liquid coolant reservoir. For example, the recuperator 30 may also comprise an injector coupled to the second liquid coolant reservoir and the controller 60 may be configured to monitor a temperature of the compressed fluid passing from the compression cylinder 10 to the combustion cylinder 20, for example via recuperator sensor 31. The controller 60 may be configured to determine if a quantity of liquid coolant is required in order to control the temperature of the gas entering the combustion cylinder 20 via inlet port 18 to be within a selected range. The selected range may be chosen to achieve efficient combustion and may be stored in a memory of the controller 60. For example, if the engine 100 is being run hard, for example because a high demand is placed on it, the injection of the first and second liquid coolants into the compression cylinder 10 may not be enough to keep the temperature of the compressed air passing from the compression cylinder 10 to the combustion cylinder 20 to be within the selected range, and so the controller 60 may be configured to control the delivery of liquid coolant into the recuperator 30 via operation of the injector to further cool the air to be within the selected range.

In some examples, the controller 60 may be configured to deliver liquid air to the compression cylinder 10 to improve the combustion efficiency of the engine 100, or for example, when a high demand is placed on the engine 100.

FIG. 2 shows another example of a split cycle combustion engine apparatus 200. The same reference numerals have been used where they relate to the same or a similar feature as in FIG. 1.

The engine 200 of FIG. 2 differs from the engine 100 of FIG. 1 in that in the engine 200 of FIG. 2 the second liquid coolant reservoir 50 is coupled to the recuperator 30. The controller 60 is configured to control delivery of liquid coolant from the second liquid coolant reservoir 50 so that the second liquid coolant may be injected into the recuperator 30 as well as the compression cylinder 10. The crankshaft 70 also includes a gearing mechanism 75 configured so that the compression piston 12 and the combustion piston 22 may operate at a different RPM.

Additionally, the engine 200 is configured so that exhaust air from the combustion cylinder 20 passes through the outlet port 19 and is routed back through the recuperator 30 so that the exhaust gas is in a heat exchange relationship with the compressed air entering the combustion cylinder 20. In this way, the temperature of the gas passing from the compression cylinder 10 to the combustion cylinder 20 may be controlled so that the engine is operating at a more efficient operating temperature.

In addition, the recuperator 30 comprises a condenser so that some of the second liquid coolant may be extracted from the exhaust air and returned to the second liquid coolant reservoir 50. The exhaust air may then be expelled from the recuperator 30 to the environment via exhaust 95. In the example shown in FIG. 2, the engine 200 also comprises an expulsion sensor 92 connected to the controller 60, for example located in the exhaust flow path downstream of the recuperator 30. The expulsion sensor 92 may be configured to measure the concentration of gasses and/or particulates leaving via exhaust 95 and send a signal comprising an indication of one of these parameters to the controller 60.

Another difference from the engine 100 of FIG. 1 is that the two portions of the crankshaft 70 to which the two pistons 12, 22 are respectively attached via connecting rods 52, 54 are not integrally connected together to rotate at the same speed. Instead, the two portions are connected via a gearing mechanism 75 which may be, for example, a transmission system or gear box of selectively variable transmission ratio. Additionally or alternatively, the gearing mechanism 75 may comprise a clutch such as a disconnect clutch.

The operation of the engine 200 of FIG. 2 is much the same as the operation described above for the engine 100 of FIG. 1. However, the operation of previously undescribed features of the engine 200 will now be described with reference to FIG. 2.

The condenser in the recuperator 30 is configured to cool the exhaust air from the combustion chamber 20. For example, where the second liquid coolant is water, this water may be cooled and condensed so that it is returned to the second liquid coolant reservoir 50, which allows for the provision of a smaller second liquid coolant reservoir 50. This may be preferable when using the engine on an automobile which does not have unlimited access to water, and thus water recycling may be used. The excess heat from the exhausted air may also be used to provide a heating mechanism for the air in the recuperator, such as a heat exchanger in heat exchange relationship with compressed air expelled from the compression cylinder 10 and entering the combustion cylinder 20. For example, the controller 60 may be configured to control operation of the recuperator 30 so that the compressed air passing from the compression cylinder 10 to the combustion cylinder 20 is within a selected range. For example, the controller 60 may be configured to heat the air if it is below the selected threshold (for example if the engine 200 is running cold, for example if it has just started), and it may be configured to cool the air if it is above the selected threshold (for example a high demand is placed on the engine 200). The controller 60 may cool the air in the recuperator may controlling the delivery of the second liquid coolant from the second liquid coolant reservoir 50, for example via operation of an injector in the recuperator 30.

In some examples, the engine 200 may also include a turbo charger or other suitable device for improving engine efficiency by extracting energy from the exhaust gas of the combustion cylinder 20.

In some examples, the engine 200 may also include a supercharger or other suitable device for increasing the pressure or density of the air supplied to the engine 200. Power for the supercharger may be provided by the crankshaft, a battery or any other suitable means.

In some examples, the engine 100, 200 may comprise a liquid nitrogen generator of known Brayton/Joule/Thompson type. This generator may include a rotary compressor, whose shaft is connected to a turbine expander and to the output of a variable ratio transmission system, the input of which is connected to the crankshaft 70. The liquid nitrogen generator also includes two heat exchangers and a fan-cooled aftercooler. In use, air is drawn into the liquid nitrogen generator by the compressor through an inlet and after compression, expansion and passing through the heat exchangers, liquid nitrogen is generated and passed to the reservoir 40.

A method of determining the amount of coolant to be used will now be described with reference to FIG. 3.

Figure 3:
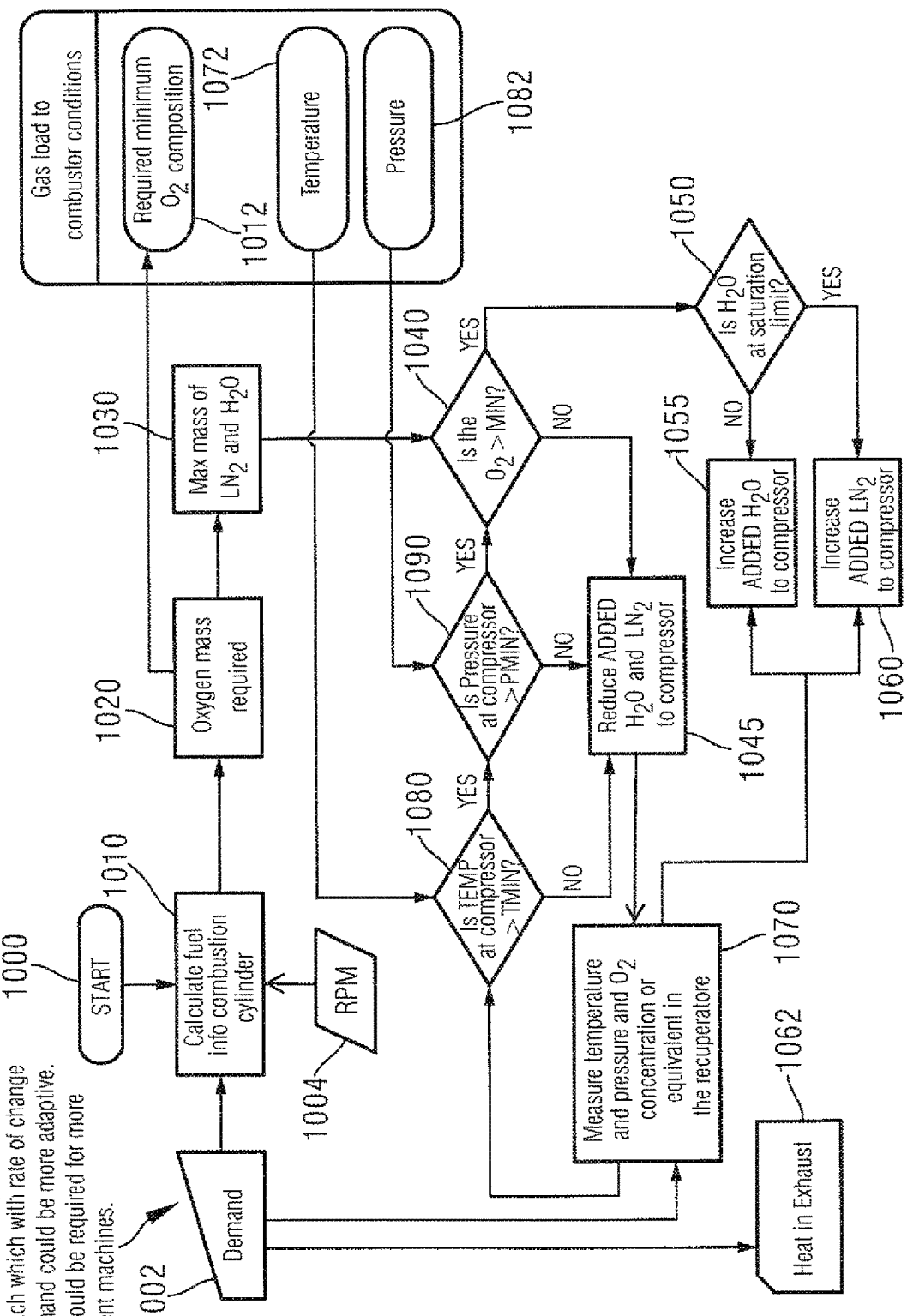
FIG. 3 shows a flow chart illustrating a method of use suitable for use with the engine of FIGS. 1 and 2.

In FIG. 3, at step 1000, the process begins. Steps 1002 and 1004 respectively comprise determining the demand and the RPM for the engine, so that at step 1010, the controller 60 is configured to calculate the required amount of fuel to be injected from the fuel reservoir 80 into the combustion cylinder 20. At step 1012, the controller 60 uses the measured conditions of the compressed air delivered from the compression cylinder 10 to the combustion cylinder 20, i.e. based on received signals from the compression sensor 11 and recuperator sensor 31, so that at step 1020 the controller 60 determines the oxygen mass required for the desired combustion effect. At step 1030, the maximum mass of the coolants is determined. In this case, the first liquid coolant is the liquid nitrogen and the second is water.

At step 1040, the controller determines, based on an indication from one of the sensors, whether or not the oxygen level is above a threshold value by comparing a data value based on the received sensor signal with a stored lookup table. If the oxygen level is determined to be above the threshold value then the method proceeds to step 1050 where the controller 60 is configured to determine if a water saturation threshold has been reached. However, if the oxygen level is below the threshold value then the method proceeds to step 1045, where the controller 60 is configured to reduce the amount of water and liquid nitrogen added to the compression cylinder.

The controller 60 may be configured to determine the oxygen mass required based on the fuel load, for instance using a lookup table comprising known oxygen requirements for the desired combustion based on the thermodynamic properties of the engine. In some embodiments, there may be more than one source of oxygen present, for example, oxygen in the air and oxygen in the form of liquid oxygen/liquid air being injected into the compression cylinder 10 as liquid coolants. Accordingly, the controller 60 is configured to determine the oxygen level in the engine, and it may adjust the quantities of liquid coolant injected into the compression cylinder 10 to ensure the oxygen level remains within a selected range.

The controller 60 may be configured to determine the oxygen level using one of the sensors. A lambda meter (an oxygen sensor) may be used to measure the oxygen concentration, for example in the recuperator 30. It is preferable to ensure that the oxygen levels do not get too low as this may result in soot building up in the exhaust and slip in the combustion cylinder.

At step 1050, the water saturation level is determined by the controller, for example based on an indication from one of the sensors. If the water saturation level has reached a selected water saturation threshold then the method proceeds to step 1060, where the controller 60 is configured to increase the amount of liquid nitrogen to be injected into the compression cylinder 10. At this stage, the controller 60 may refrain from injecting any more water into the compression cylinder 10 until the water saturation level if below the water saturation threshold value. If, at step 1050, the water saturation level is below the water saturation threshold then the method proceeds to step 1055, where the controller 60 is configured to increase the amount of water injected into the compression cylinder 10. At this stage, the controller 60 may refrain from injecting any liquid nitrogen into the compression cylinder 10 until the water saturation threshold is reached.

After both steps 1045, 1055 and 1060, the method proceeds to step 1070. Step 1070 draws input from step 1062, where the heat in the exhaust is measured, for example using one of the exhaust sensor 91 or the expulsion sensor 92. At step 1070, the controller 60 is configured to measure at least one of: temperature, pressure and oxygen content in the recuperator 30. For instance, this may be determined using the recuperator sensor 31. Step 1070 may commence a cycle of measuring the temperature, pressure, oxygen saturation and water saturation and the controller 60 receiving signals based on these measured parameters, and adjusting the delivery of coolant accordingly.

At step 1080, the controller 60 is configured to determine, based on a temperature measurement from one of the sensors, whether the temperature in the compression cylinder 20 is above a threshold value. If the temperature is high enough, for example above the threshold value, the method proceeds to step 1090, where the controller 60 is configured to determine whether the pressure in the compression cylinder 20 is above a threshold value. If the pressure is high enough, for example above the threshold value, the method proceeds to step 1040, as discussed above. For any of steps 1080, 1090 and 1040, if the threshold values are not reached, the method proceeds to step 1045, where the controller 60 is configured to reduce the amount of both of the liquid coolants delivered.

Figure 4:
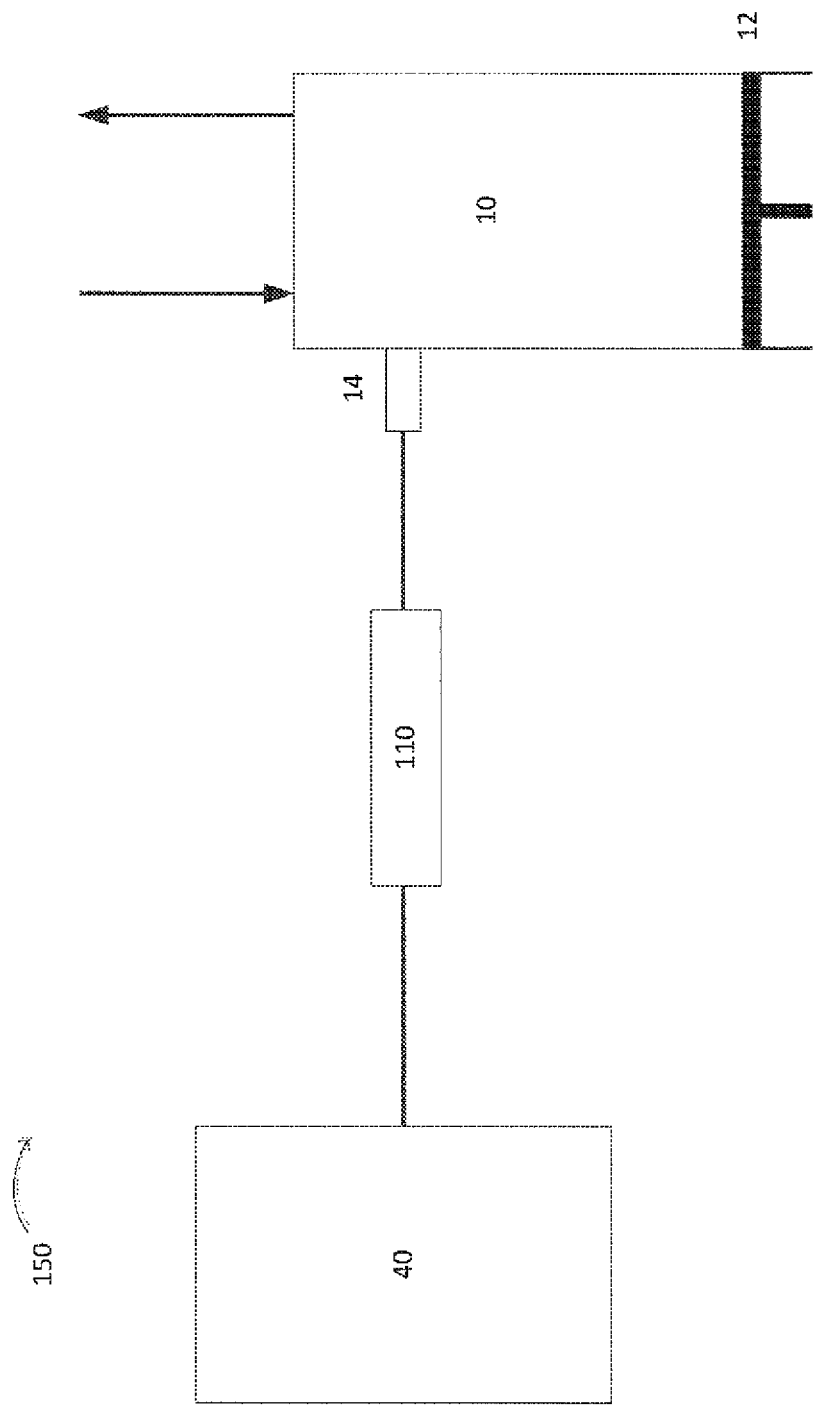
FIG. 4 shows a schematic diagram of an injection apparatus suitable for use in the engine of FIGS. 1 and 2.

FIG. 4 shows a liquid coolant injection apparatus 150 for injecting a liquid coolant into the compression cylinder 10 of a split cycle engine, such as the engine 100, 200 described above. The apparatus 150 is operated by a controller such as controller 60 described above, which may be configured to control delivery of at least one of a first liquid coolant and a second liquid coolant based on an indication of at least one parameter associated with the engine 100, 200.

The coolant injection apparatus 150 shown in FIG. 4 comprises a liquid coolant reservoir 40 coupled to a compression cylinder 10 of a split cycle engine via a filter 110 and a liquid coolant injector 14. The reservoir 40 is in fluid communication with a liquid coolant fluid path that extends through the filter 110 to the liquid coolant injector 14. The liquid coolant injector 14 is coupled directly to the compression cylinder 10.

The liquid coolant reservoir 40 is operable to provide a liquid coolant to the filter 110 via the liquid coolant flow path. The filter 110 is operable to remove solid contaminants from the liquid coolant and enable the flow of filtered liquid coolant to the liquid coolant injector 14 which is operable to control the injection of liquid coolant into the compression cylinder 10.

The system of FIG. 4 will now be described in operation as an example. The reservoir 40 stores a liquid coolant, this could be liquefied air, water or another liquid that has been condensed into a liquid phase via refrigeration. In this example the liquid coolant is liquid nitrogen.

Figure 6A:
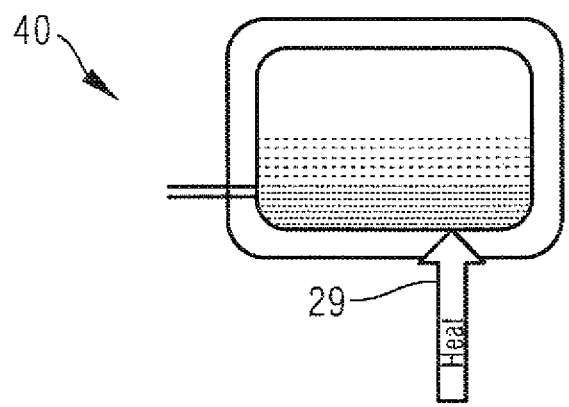
FIGS. 6a and 6b show example schematic diagrams of a liquid coolant reservoir for use with the engine of FIGS. 1 and 2.
Figure 6B:
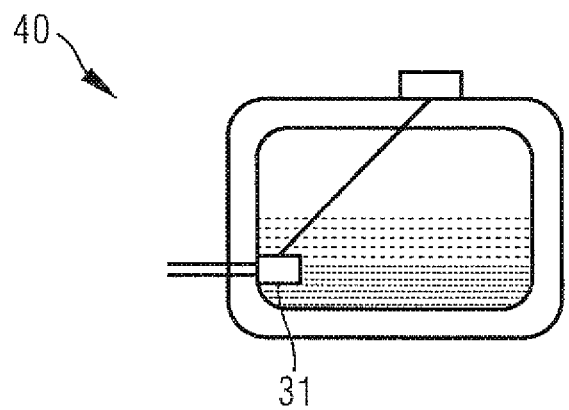

As shown in FIGS. 6*a* and 6*b*, the reservoir 40 contains a driver that is able to increase the pressure within the reservoir 40, thereby forcing the liquid nitrogen along the liquid coolant flow path. The driver may comprise a heater 29 and/or pump 31 which can produce a pressure differential between the reservoir 40 and the liquid coolant flow path 118. For example, a heater 29 is operable to heat a portion of the reservoir 40 in response to a control signal from the controller 60. This creates a pressure differential in the reservoir 40 to drive a portion of the liquid nitrogen towards the compression cylinder 10. The heater 29 may recycle heat from the engine through the exhaust or may comprise a resistor that a potential difference is applied across to cause heating. In some examples, the reservoir 40 also comprises a pressure release valve to prevent over pressurisation of the reservoir 40. This valve allows the nitrogen gas generated by the heater to vent in the case that the pressure of the tank 40 is beyond a selected threshold. This threshold may, for example, be based on an upper operating pressure of the liquid coolant injection system 150, for example, as determined by the controller 60. The provision of a heater 29 in the reservoir 40 may also act to prevent the reservoir 40 from achieving sub-atmospheric pressures, which is undesirable as sub-atmospheric pressures may draw ambient air into the reservoir 40 which may freeze and form undesirable ice crystals.

Once a pressure differential has been achieved within the reservoir 40 using the methods and apparatus described above with reference to FIGS. 6a and 6b, the liquid nitrogen flows towards the compression cylinder 10 due to the created pressure differential. The liquid coolant flow path passes through a filter 110 which removes solid contaminants from the liquid nitrogen. This filtering step helps to remove impurities within the nitrogen gas, such as water or carbon dioxide crystals, which can damage the liquid coolant injector 14 via abrasion.

After passing through the filter 110, the liquid nitrogen continues along the liquid coolant flow path to the liquid coolant injector 14 due to the pressure differential. The injector 14 is operable, by a control signal from the controller 60, to inject a determined amount of liquid nitrogen into the compression cylinder 10. The delivery of the liquid nitrogen may be controlled by the controller 60 based on received parameters as described above in relation to FIGS. 1-3.

Figure 5:
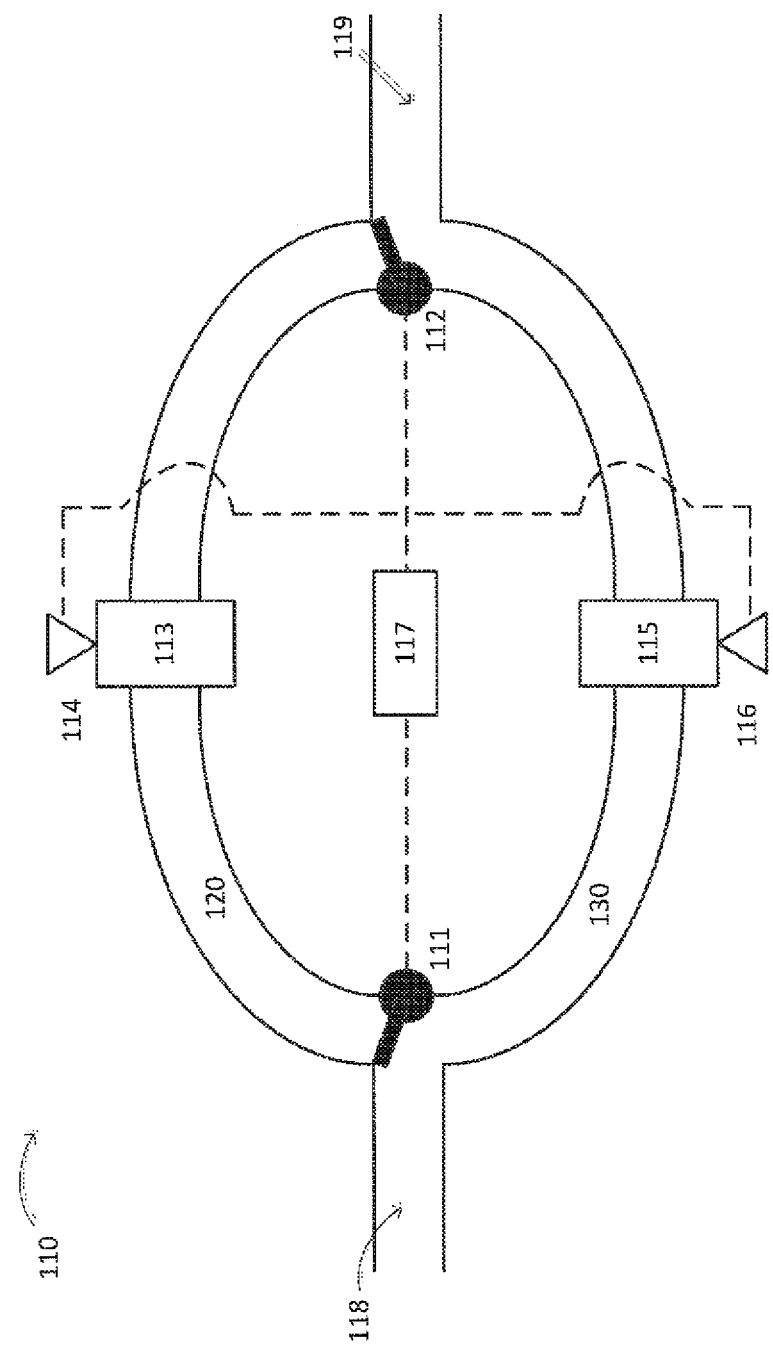
FIG. 5 shows a schematic diagram of a filter system suitable for use in the engine of FIGS. 1 and 2.

FIG. 5 shows an example filter apparatus 110 for removing solid contaminants from a liquid coolant flow path, for example for use with the coolant injection apparatus 150 described above with respect to FIG. 4. The filter 110 comprises two liquid coolant flow paths 120, 130 coupled in parallel to an inlet 118 and an outlet 119 at respective ends thereof. The filter 110 comprises two portions 113, 115 wherein one portion 113 lies along the first liquid coolant flow path 120 between the inlet 118 and the outlet 119 and a second filter portion 115 lies along a second liquid coolant flow path 130 between the inlet 118 and outlet 119. The example shown in FIG. 5 also comprises two diverters 111, 112, one on either side of the filter portions 113, 115, each diverter 111, 112 at a respective join between the inlet 118 and the two flow paths 120, 130 and the outlet 119 and the two flow paths 120, 130. Additionally, in the example shown in FIG. 5 there are two heating elements 114, 116, each coupled to a respective filter portion 113, 115. The heating elements 114, 116 and diverters 111, 112 are coupled to a controller 60, which may be the same controller 60 as the controller described above in relation to FIGS. 1 to 4.

The diverters 111, 112 are operable to direct the liquid coolant along the liquid coolant flow path and are controlled by the controller 60. These diverters may be valves that modify the liquid coolant flow path and allow the filter portions 113, 115 to be interchanged. The controller 60 may operate these diverters 111, 112 according to a selected routine (for example as stored in the controller 60), allowing each filter portion 113, 115 to be in the liquid coolant flow path for a selected time interval before interchanging the filter portions 113, 115, for example so that liquid coolant flows through the first liquid flow path 120 for a first selected time interval, and then through the second liquid flow path 130 for a second selected time interval, and so on.

Alternatively, the controller 60 may receive signals comprising sensor data that can be used to determine properties of the liquid coolant flow. For example, the filter apparatus 110 could include pressure sensors located along the liquid coolant flow path 120, 130, sensors in the inlet 118 and outlet 119, and/or sensors in the reservoir 40, and at the input of an injector coupled to the outlet 119 of the filter apparatus.

For example, the controller 60 may be configured to determine if a blockage exists in the filter portions 113, 115 and operate the diverters 111, 112 and heating elements 114, 116 accordingly. For example, if the pressure difference between the input of the filter 118 and the input of the injector exceeds a selected threshold, this may indicate that the first filter portion 113 is close to saturation with solid contaminants and is providing a significant blockage in the liquid coolant flow path 120. The controller 60 may therefore determine that a blockage condition exists, and control the diverters 111, 112 to divert liquid away from the first liquid flow path 120 and only via the second liquid flow path 130 via second filter portion 115. Because no liquid coolant is passing through the first liquid flow path 120 and through the first filter portion 112, the first filter portion 113 can either heat naturally due to the ambient temperature (and because no cold liquid coolant is flowing through it), or it can be heated, for example by the controller 60 controlling the heating element 114, to remove the solid contaminants by melting and/or evaporation. Once the solid contaminants have been removed, the diverters 111, 112 may be operated to pass the liquid coolant back through both liquid flow paths 120, 130 or through only one liquid flow path 120, 130 at a time.

A further option may include sensing the temperature of the filter portions 113, 115. When the filter becomes "clogged" with containments the local temperature of the filter portions 113, 115 may increase, indicating a clog condition. This can be sensed by a temperature sensor, such as a thermocouple, and reported to the controller 60 via sensor signals. The controller 60 may determine that the filter portions 113, 115 should be interchanged based on these received sensor signals.

In some examples, the controller 60 may be configured to reduce the flow rate of liquid coolant through the filter 110 to create an increase in temperature of the filter portions 113, 115.

In the embodiment of FIG. 5, the filter portions 113, 115 are copper meshes capable of catching solid contaminants but allowing the passage of liquid coolant therethrough. The use of a copper mesh is advantageous as it is conductive, allowing the heaters 114, 116 to be inductive coils that can be located outside of the liquid coolant flow path but still provide the desired heating effect. When the filter portions 113, 115 are interchanged, the inactive portion may be "clogged", holding a large amount of solid contaminants. The heaters 114, 116 allow the copper mesh to be heated, causing the solid contaminants to either evaporate or melt. These can then be vented from the filter 110 using a pressure release valve.

In addition to the use of heating to remove solid contaminants, the filter may comprise U-bends, for example in each liquid coolant flow path 120, 130, so as to inhibit any liquid that does not completely evaporate, such as water, from building up and being carried with the liquid coolant flow, thus potentially damaging the engine 100, 200. The U-bends may further comprise a valve arranged so that the U-bends can be drained at selected intervals, for example by operation of the controller 60 or by a user.

Alternative embodiments may use different heating means to those described above. These could include using recycled heat from the exhaust of the split cycle engine 100-, 200 to heat the filter portions 113, 115. This has the advantage of not requiring an additional heating system and may be more efficient as it uses recovered heat. Depending on the heating of the surrounding apparatus, the filter portions 113, 115 may not require active heating and instead they may simply be allowed to warm up to the ambient temperature, which may be sufficient to enable solid contaminants to be removed from the filter 110.

In addition to different heating means, the material of the filter portions 113, 115 can also be varied. For example, instead of copper in the above example, the filter portions 113, 115 could comprise an aluminium mesh which could also be heated through inductive heating. Other materials such as carbon fibres may also be used.

Figure 7:
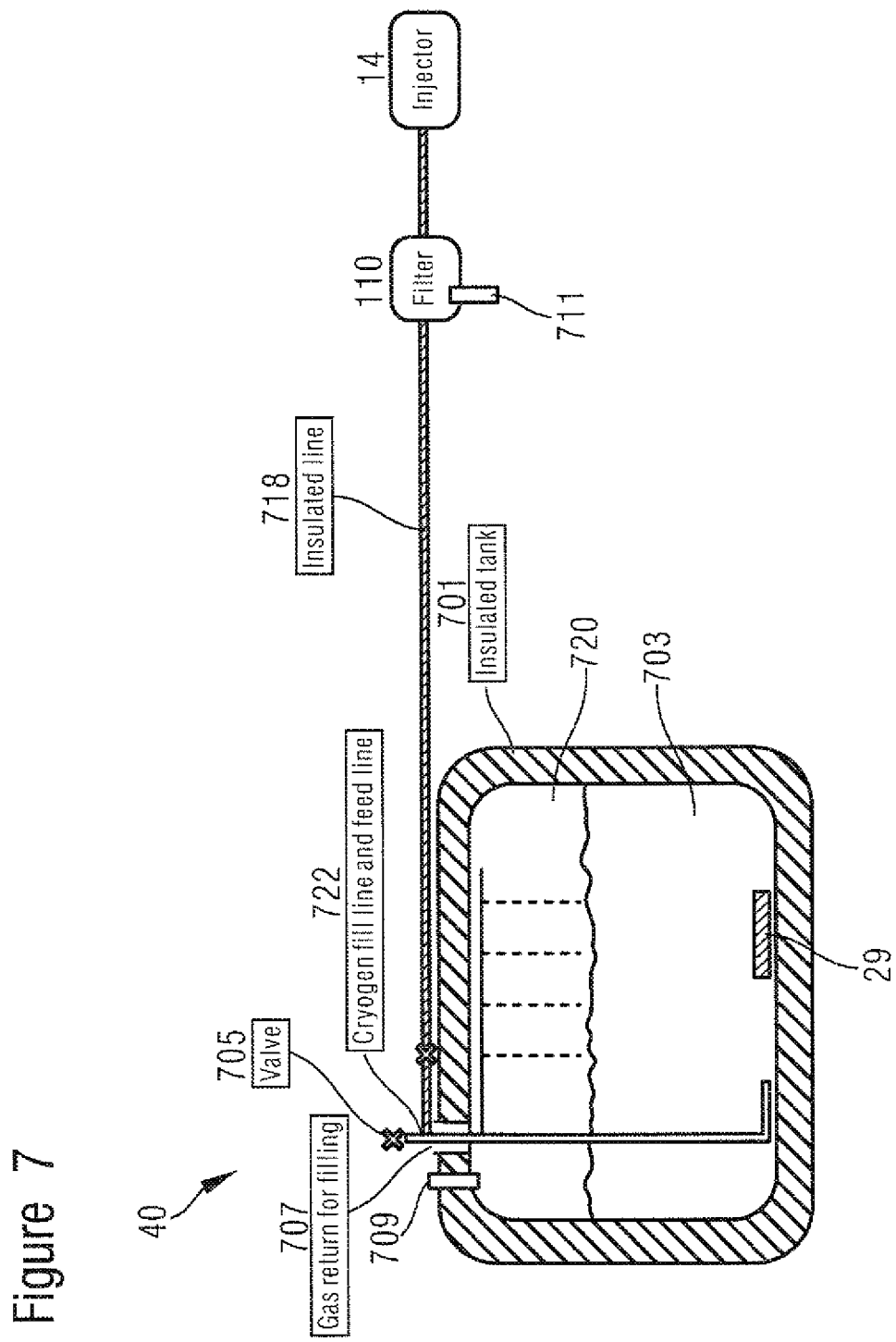
FIG. 7 shows an alternative arrangement of the liquid coolant reservoirs described and shown in FIGS. 6a and 6b for use with the split cycle engine apparatus of FIGS. 1 and 2.

FIG. 7 shows an alternative arrangement of the liquid coolant reservoirs described and shown in FIGS. 6a and 6b for use with the split cycle engine apparatus of FIGS. 1 and 2. The reservoir 40, 50 comprises an insulated tank 701 arranged to enclose a liquid coolant 703 such as a cryogen, for example liquid nitrogen, that has been condensed into a liquid phase via a refrigeration process. At the bottom of the tank 701 is a driver 29 arranged to create a pressure differential in the tank 701, such as the driver described above in relation to FIGS. 6a and 6b. In the example shown the driver 29 is a resistive element arranged to provide a degree of resistive heating to the liquid coolant when a current is passed through it. The tank 701 is coupled to a compression cylinder 10 of a split cycle engine 100, such as the engine of FIGS. 1 and 2, via an insulated line 718 through filter 110 and injector 14, as discussed above in relation to the earlier FIGS.

The insulated line 718 extends through the wall of the tank 701 and extends down to the bottom of the tank 701 so that it can still extract liquid coolant even when the level of liquid coolant in the tank is low. It will be understood that the insulated line 718 need not be insulated inside the tank 701. The insulated line 718 is coupled to the tank via a valve 705 and a gas return valve 707 for filling the tank 701. The tank 701 further comprises two pressure release valves 709 so that the pressure in the tank 701 does not reach dangerous levels. In the example shown, the filter apparatus 110 also comprises two pressure release valves 711. One of the pressure release valves 709, 711 may be set to a normal operating pressure of the apparatus, and the other may be set above the normal operating pressure but below a maximum safe operating pressure, for example.

In some examples, as shown in FIG. 7, the insulated line 718 may be coupled to a separate feed line 722, for example proximal to the valve 705, however in other examples it will be understood that the insulated line 718 may act as a feed line. In the example shown in FIG. 7, also coupled to the insulated line 718/feed line 722 inside the tank is an optional spray bar 720 that can act to supply liquid coolant (for example recovered liquid coolant recovered from the recuperator 30 described above) in the form of a spray over liquid coolant stored 703 stored in the tank 701 so as to cool the stored liquid coolant 703.

The arrangement of the tank 701 illustrated in FIG. 7 is such that no trapped volumes of liquid coolant exist, and so that the pressure in the reservoir 40 never goes sub-atmospheric. In some examples there are two valves, for example on the line 718, arranged in parallel so that if one ices there is no trapped volumes of liquid coolant and so that the pressure in the reservoir 40 does not increase. The tank 701 is also arranged to reduce the number of heat leak paths occur and take liquid coolant from near the bottom of the tank 701.

FIG. 8 is a graph showing how work and mass change with the introduction of water and liquid nitrogen (as example liquid coolants) in the compression cylinder of a split-cycle engine apparatus, for example the split-cycle engine apparatus described above. At Point A there is no LN2 or water added. The starting point on the Y axis intersections are two families. Above A is the percentage mass compressed each stroke of the compressor as the amount of liquid nitrogen (LN2) is increased with each line representing an increase in water. In each case the amount of air entrained into the compression cylinder is constant.

Below A the graph illustrates the same increases in mass of water and LN2 but shows how the specific work changes. The point identified is where the mass compressed per stroke reaches 150%, but where the specific work required to do this is only about 65-70% if no liquid nitrogen or water were added. This is an important point with a 6-cylinder engine as a compression cylinder could be removed completely from the engine, reducing friction and pumping losses, whilst still producing the same amount of specific work as a conventional 6 cylinder engine.

It is notable that at this point the O2 molecular concentration is reduced to 65% that of normal air (under standard conditions). Depending on the load point, it may be desirable to either use liquid air or add liquid oxygen instead of the LN2 to facilitate a larger fuel load. Typically, there will be an excess of oxygen present, but it may be necessary to add more oxygen when the engine is experiencing a high demand.

In some embodiments, the air drawn into the compression cylinder 10 may be intercooled first. This increases the density of the air, however it results in lost heat as the air in the compression cylinder 10 is colder (which may be inefficient for combustion). The engine may be configured so that before the air enters the compression cylinder 10, the incoming air is in a heat exchange relationship with one of the liquid coolants, for example water, such that the air is cooled and the water is warmed prior to injection into the compression cylinder 10.

FIG. 9 shows the effect of changing the feed temperatures for the air being drawn into the compression cylinder and the water being injected into the compression cylinder as a liquid coolant. In FIG. 9, before being drawn into the compression cylinder 10, the incoming air is cooled by using it to heat the water. By providing cooler air, the air density increases which allows for a greater mass of air to be fed into the compression cylinder 10. A greater mass of air comprises more oxygen, which may be desirable for combustion. FIG. 9 shows that a greater percentage mass of working fluid per stroke may be achieved when using cooler/denser air.

An effect of providing more air into the compression cylinder 10 and/or pre-warming the water is to cause the boiling temperature of the water in the compression cylinder 10 to increase. This may enable the water to absorb more heat before it vaporises.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

It is to be appreciated in the context of this disclosure that although reference has been made to two or three liquid coolants being used, this is not considered to be limiting, as more liquid coolants may be used. Additionally, the liquid coolants may be pre-combined before being injected together into the compression cylinder 10, or they may be injected separately. The controller 60 may determine a mixture of coolants based on the demands and thermodynamic variables of the engine. For example, the controller 60 may determine that more oxygen should be added to the compression cylinder 10, and accordingly, the controller may pre-mix an oxygen-containing coolant with another coolant to a selected ratio at which the oxygen demands will be met.

There may be a connection between liquid coolant reservoirs controllable by the controller 60 so as to enable the pre-mixing of the coolants. Alternatively, the injector may have two fluid inlets, and the controller 60 may control the flow of each fluid into the injector to meet the selected ratio of coolants in the mixture. Accordingly, the coolants may be pre-mixed prior to injection, with the mixture being at a selected ratio, which may be determined and controlled by the controller 60.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

The invention claimed is:

1. A split cycle internal combustion engine, comprising:
a combustion cylinder accommodating a combustion piston;
a compression cylinder accommodating a compression piston and being arranged to provide compressed fluid to the combustion cylinder; wherein:
the compression cylinder comprises a liquid coolant inlet, wherein the liquid coolant inlet is in fluid communication with a liquid coolant reservoir via a liquid coolant flow path, and comprises a filter for filtering a liquid coolant, wherein the filter comprises a first portion and a second portion and wherein the first and second portions are arranged to be interchangeable in response to a control signal from a controller so that first and second portions can be swapped in and out of the liquid coolant flow path;
the first and second portions of the filter are each configured to filter a liquid coolant which has been condensed into its liquid phase via a refrigeration process; and
the engine comprises a heater, and the engine is configured to operate the heater to heat a respective one of the first and second portions of the filter while the other one of the first and second portions of the filter is operated to filter liquid coolant in the liquid coolant flow path.

2. The split cycle internal combustion engine of claim 1, wherein the heater is arranged to use residual heat from an exhaust of the split cycle internal combustion engine.

3. The split cycle internal combustion engine of claim 1, wherein the heater works by an inductive heating process.

4. The split cycle internal combustion engine of claim 1, wherein each of the first and second portions of the filter is located in a respective liquid coolant flow path coupled between the liquid coolant reservoir and the liquid coolant inlet.

5. The split cycle internal combustion engine of claim 1, further comprising the liquid coolant which has been condensed into its liquid phase via a refrigeration process.

6. The split cycle internal combustion engine of claim 1, further comprising a heat exchanger arranged to exchange heat between an exhaust fluid exhausted from the combustion cylinder and compressed fluid being provided from the compression cylinder to the combustion cylinder.

7. The split cycle internal combustion engine of claim 1, further comprising a controller, and wherein the controller is configured to control the heater to heat the first portion of the filter after swapping the first portion out of the liquid coolant flow path to remove solid contaminants from the first portion of the filter.

8. The split cycle internal combustion engine of claim 7, wherein the controller is configured to control the heater to heat the second portion of the filter after swapping the second portion out of the liquid coolant flow path to remove solid contaminants from the second portion of the filter.

9. A split cycle internal combustion engine comprising:
a combustion cylinder accommodating a combustion piston;
a compression cylinder accommodating a compression piston and being arranged to provide compressed fluid to the combustion cylinder; wherein
the compression cylinder comprises a liquid coolant inlet, wherein the liquid coolant inlet is in fluid communication with a liquid coolant reservoir via a liquid coolant flow path, wherein the liquid coolant reservoir comprises a driver arranged to create a pressure differential in the liquid coolant reservoir to drive a portion of the liquid coolant towards the compression cylinder, wherein the driver comprises a heater arranged to heat a portion of the liquid coolant reservoir in response to a control signal from a controller to create a pressure differential in the liquid coolant reservoir to drive a portion of the liquid coolant towards the compression cylinder.

10. The split cycle internal combustion engine of claim 9, wherein the driver comprises a pump arranged to drive liquid coolant from the liquid coolant reservoir into the compression cylinder in response to a control signal from a controller to create a pressure differential in the liquid coolant reservoir to drive a portion of the liquid coolant towards the compression cylinder.

11. The split cycle internal combustion engine of claim 9, wherein the liquid coolant reservoir comprises a pressure release valve for preventing over pressurisation of the liquid coolant reservoir.

12. The split cycle internal combustion engine of claim 11, wherein the pressure release valve is arranged to vent in the event that pressure in the liquid coolant reservoir exceeds a first selected threshold.

13. The split cycle internal combustion engine of claim 12, wherein the pressure release valve is a first pressure release valve, and wherein the liquid coolant reservoir comprises a second pressure release valve, wherein the second pressure release valve is arranged to vent in the event that pressure in the liquid coolant reservoir exceeds a second selected threshold.

14. The split cycle internal combustion engine of claim 13, wherein the first selected threshold is selected to correspond to a normal operating pressure for the liquid coolant reservoir, and wherein the second selected threshold is selected to correspond to a pressure which exceeds a normal operating pressure for the liquid coolant reservoir.

15. The split cycle internal combustion engine of claim 9, wherein the liquid coolant reservoir is thermally insulated.

16. The split cycle internal combustion engine of claim 9, wherein the liquid coolant reservoir is coupled to the compression cylinder via a fluid line, and wherein the fluid line is insulated.

17. The split cycle internal combustion engine apparatus of claim 9, wherein the heater comprises a resistor configured to provide resistive heating to the portion of the liquid coolant reservoir in response to the control signal from the controller.

18. A filter apparatus for use in a split cycle internal combustion engine for removing solid contaminants from a liquid, wherein the liquid is condensed into a liquid phase via a refrigeration process, wherein the filter apparatus comprises:

a liquid inlet;

a liquid outlet, wherein the liquid inlet is coupled to the liquid outlet via a filtering element, the filtering element comprising a first portion and a second portion; and a diverter arranged to direct liquid through the first portion of the filtering element and, in response to a control signal, direct liquid through the second portion of the filtering element;

wherein the first and second portions of the filtering element are each configured to filter a liquid coolant which has been condensed into its liquid phase via a refrigeration process; and wherein the filter apparatus is configured to heat a respective one of the first and second portions of the filtering element while liquid coolant is directed through the other one of the first and second portions of the filter.

* * * * *

UNITED STATES PATENT AND TRADEMARK OFFICE
CERTIFICATE OF CORRECTION

PATENT NO. : 11,536,190 B2
APPLICATION NO. : 17/388460
DATED : December 27, 2022
INVENTOR(S) : Andrew Atkins and Robert Morgan It is certified that error appears in the above-identified patent and that said Letters Patent is hereby corrected as shown below:

On the Title Page

After "Related U.S. Application Data (63) Continuation of application No. 16/498,271, filed as application No. PCT/GB2018/050642 on Mar. 13, 2018, now Pat. No. 11,092,066." insert --Foreign Application Priority Data – Mar. 29, 2017 (GB) 1705046.9--

Signed and Sealed this
Thirty-first Day of January, 2023

Katherine Kelly Vidal
*Director of the United States Patent and Trademark Office*